June 26, 1962     A. D. KOMPELIEN ETAL     3,040,737
BLOOD PRESSURE MEASURING TRANSDUCER
Filed Dec. 10, 1959
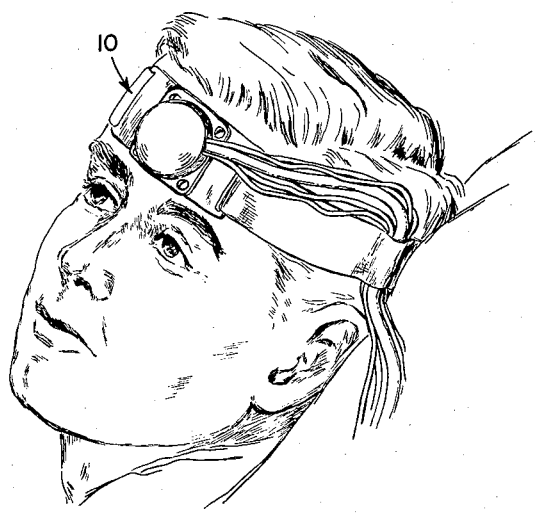
*Fig_1*
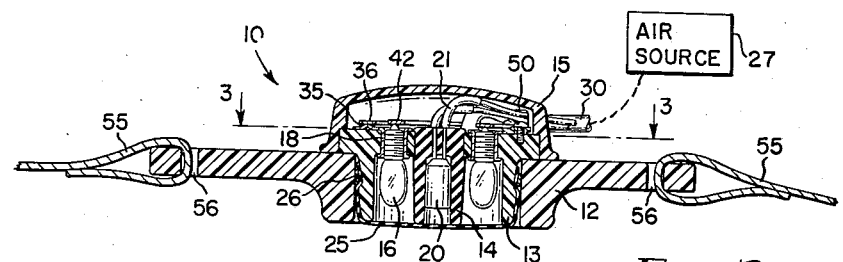
*Fig_2*
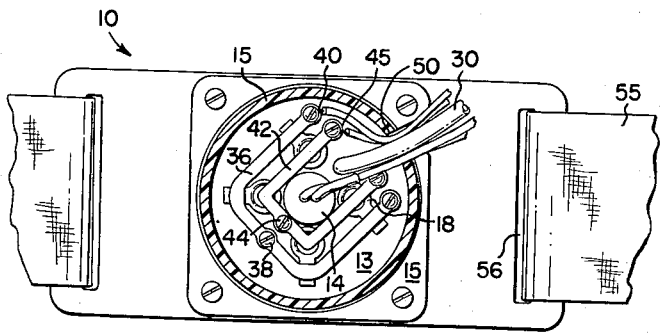
*Fig_3*
INVENTORS
ARLON D. KOMPELIEN
ASBJORN M. SEVERSON
BY
*Joseph E. Ryan*
ATTORNEY

United States Patent Office 3,040,737
Patented June 26, 1962

3,040,737
BLOOD PRESSURE MEASURING TRANSDUCER
Arlon D. Kompelien, Richfield, and Asbjorn M. Severson, Minneapolis, Minn., assignors to Minneapolis-Honeywell Regulator Company, Minneapolis, Minn., a corporation of Delaware
Filed Dec. 10, 1959, Ser. No. 858,686
7 Claims. (Cl. 128—2.05)

Our invention relates to apparatus for measuring blood pressure of a human being and more particularly to an improved blood pressure measuring transducer.

Blood pressure measurement has normally been accomplished through the use of the sphygmomanometer or arm cuff which is limited to manual operation and visual indication. For automatic measurement of blood pressure and for increased accuracy and repeatability of results the arm cuff has not been suitable and the ear cuff, such as is shown in the E. H. Wood Patent 2,706,927 dated April 26, 1955 and in the Kompelien copending application Serial No. 846,468 on Apparatus for Automatically Measuring Blood Pressure and Pulse Rate dated October 14, 1959, has been utilized. In addition the arterial puncture for the insertion of a blood pressure measuring transducer has been utilized but the attendant surgical difficulties make this approach unfeasible for universal application. Similarly the ear cuff, because of the differing physical characteristics between persons, presents difficulties for uniform application causing inaccuracies in readings and nonrepeatability of measurements. However the light source-photocell method of detecting both oxygen content of blood and the presence of blood in a portion of the human body appears to be the most practical approach for measurement of blood pressure. The present invention is directed to an improved blood pressure measuring transducer of this general type which is applied to the portion of the human body most accessible and uniform from the standpoint of measurement and presenting the greatest uniformity in skin texture and the least cartilage to affect the accuracy in measurement. Our blood pressure measuring apparatus is designed to sense blood pressure at the forehead and utilizes the photocell-light source combination to detect the blood flow in this skin area. The improved device combines the light source and photocell at the same surface at which the measurement is to be taken permitting measurement at the forehead and utilizes light reflections from the skull to transmit the light from the source through the flesh and capillaries to the photocell detector. This permits a simplified arrangement of parts which is economical to manufacture and maintain and is readily applicable to all humans. It further is much more accessible for application to in-bed patients, and from the standpoint of convenience and a minimum of discomfort to the patient is most applicable for postoperative patients where continuous measurement of blood pressure is desirable.

It is therefore an object of this invention to provide an improved blood pressure measuring transducer. It is further an object of this invention to provide an apparatus of this type which overcomes the difficulty of mounting and repeatability in results to provide an extremely accurate blood pressure measurement. Another object of this invention is to provide a blood pressure measuring transducer which is readily applicable to a portion of the human body which is least susceptible to cartilage or nonuniformity of skin and flesh thickness. A still further object of this invention is to provide an improved device of this type which is simple in application to the patient and provides a minimum amount of discomfort thereto. Another object of this invention is to provide an improved blood pressure measuring transducer which is economical to manufacture and maintain. These and other objects of this invention will become apparent from the reading of the attached description together with the drawings wherein:

FIGURE 1 is a drawing showing the apparatus applied to a human being,

FIGURE 2 is a side elevation view in section of the blood pressure measuring transducer, and FIGURE 3 is a plan view of the apparatus partly in section, taken along the line 3—3 of FIG. 2.

Our improved blood pressure measuring transducer is shown at 10 in FIGURE 1 as applied to the forehead of a patient, the apparatus being strapped around the head of the patient and the sensing portion being fixed or positioned on the forehead of the patient. This apparatus, as shown in detail in FIGURES 2 and 3, includes basically a main support 12 having a first cylindrical casing 13 mounted thereon or attached thereto through suitable means and a second cylindrical casing member 14 positioned within the first cylindrical casing member and being concentric therewith. The parts 13 and 14 are made of an opaque material and are of approximately the same axial dimension for purposes to be later described. Inner cylindrical casing or member 14 is here shown mounted on the outer cylindrical casing member which, in turn, is held to or secured to the support 12 by means of a cover member 15 through suitable means, such as screws. Positioned in the outer cylindrical casing member and uniformly spaced therein are four light sources or bulbs 16 which are mounted in suitable socket members indicated at 18 in the cylindrical casing member 13 to position the same therein and seal the light sockets therein. Positioned within the cylindrical casing member 14 is a detector comprising a photocell 20, the lead extremities 21 leading therefrom being sealed in the casing member 14. Covering the open end of the cylindrical casing members 13 and 14 there is a flexible diaphragm 25 which is made of a light transparent material which is held in position over the extremities of the cylindrical casing members and sealed to the support 12 through the clamping action of the cylindrical casing member 13 and support 12 and a sealing bead 26. The light sources and photocell 16 and 20 respectively are so positioned in the respective cylindrical casing members such that the light rays will not directly fall on the photocell to activate the same. In addition to the above, an air line or source 27 is connected to the chambers formed by the inner and outer cylindrical casing members so as to fill the chambers with an air pressure and deflect the diaphragm. A tubular connection 39 leading through the cylindrical member 13 connects the air source 27 to these chambers.

The four bulbs 16 are provided with an electrical connection in the form of raised projections 35 on the socket mounting members 18 cooperating with the metallic conductor strip 36 which is anchored to the cylindrical casing member 13 through screw means at 38 and including a lead connection 40. The tips of the bulbs are also connected by means of a conducting strip 42 which is, in turn, anchored through screws 44 to the casing member 13 with a lead conductor 45 secured to the connector 42 and leading therefrom to supply power to the light source or bulbs. The cover member 15 has a suitable aperture indicated at 50 therein through which the lead connections 40, 45 from the light source and 21 from the photocell together with the pneumatic tubing 30 extend. The transducer 10 includes a pair of connecting straps 55 which connect through apertures 56 in the support 12 to suitably secure the transducer to the forehead of the person whose blood pressure is to be measured. With variation in pressure in the chamber formed between the diaphragm and the cylindrical casing members 13 and 14 in the support 12, the flexible end wall formed by the diaphragm will expand causing the occlusion of the blood or forcing the blood from the capillaries under the skin area to which the transducer is applied. Light rays directed from the lamps will be reflected from the skull to the photocell and some light rays will be diffused through the blood capillaries before returning to the photocell. The change in concentration of blood in this area underneath the photocell will determine, with the pressure applied to this area via the diaghragm 25, the diastolic and systolic blood pressure.

Thus when no pressure is applied to the chamber under the diaphragm and the apparatus is suitably mounted on the forehead of the patient, normal blood flow in the capillaries will cause diffusion or interruption of the light reflected to the photocell to a point where a predetermined photocell output would be obtained. An increase in pressure to the diastolic blood pressure point will cause the blood to be forced from the arteries at the diastole part of the heart cycle, so that the blood being forced with the heart pumping action will present a maximum variation in photocell output. Increased pressure in this chamber, that is, clamping pressure, will allow less blood to flow during the systole part of the heart cycle, and will present the condition of systolic blood pressure. Systaltic blood pressure is indicated when the chamber pressure is increased to a point where the photocell output goes to zero, or the point where the heart cannot force any more blood through the pressurized area. An apparatus for measuring and recording blood pressure will be found in the Kompelien application previously referred to.

The forehead location for measuring of blood is ideal since it presents a fairly large flat surface with very little or no cartilage and a very thin section of flesh to present the most uniform surface and blood flow. By providing a projection on the support 12 and making the cylindrical casing members 13—14 of the same axial dimension, a relatively large cushion area for the apparatus is applied so that no extraneous pressure signals will be applied to the forehead and the variation of blood flow will be determined only by the pressure applied through the membrane or diaphragm. Thus with the apparatus strapped in place and securely held there, extraneous light sources should not reach the area of the photocell to provide extraneous signals so that the major part of the light seen by the photocell is that dispersed by the capillaries and flesh from the source. The signal output from the photocell will be in the alternating current type recording blood pressure variations with heart pumping action. This arrangement of parts provides for mounting both the photocell and the light sources on the same side of the surface from which measurement is to be taken and simplifies the constructional details of the apparatus as well as minimizing the cost. It further permits the application of the measuring transducer to the portion of the body which presents the least amount of discomfort to the patient particularly if this should be an in-bed patient in a hospital undergoing hospitalization care.

In considering this invention it should be remembered that the present disclosure is illustrative only and that the scope of the invention should be determined only by the appended claims.

We claim as our invention:

1. A blood pressure measuring transducer comprising a first cylindrical casing member and a support secured thereto, a second cylindrical casing member concentric with the first casing and attached within said first casing member, said inner and outer casings defining a pair of concentric chambers, a light source positioned in the outer chamber and sealed to said first casing member, a photocell positioned in said inner chamber and sealed to second cylindrical member, said inner cylindrical member being made of a light shielding material, a flexible diaphragm secured to said first cylindrical casing enclosing the same to complete the sealed chambers and being made of a light-transmitting material, an air source connected to said support and permitting variation in air pressure within said chambers, and attachment means connected to said support and adapted to mount said transducer on the head of the person whose blood pressure is to be taken.

2. A blood pressure measuring transducer comprising a first cylindrical casing member and a support secured thereto, a second cylindrical casing member concentric with the first casing and positioned within said first casing, said inner and outer casings defining a pair of concentric chambers, a plurality of light sources uniformly positioned in a first of said chambers and sealed therein, a photocell positioned in a second of said chambers and sealed therein, said inner cylindrical member being made of a light shielding material, a flexible diaphragm secured to said first cylindrical casing enclosing the same to complete the sealed chambers and being made of a light-transmitting material, an air source connected to said chambers and providing for variation in air pressure within said chambers, and attachment means connected to said support and adapted to mount said transducer on the head of the person whose blood pressure is to be taken.

3. A blood pressure measuring transducer comprising a first cylindrical casing member and a support connected thereto, a second cylindrical casing member concentric within the first casing and attached to said first cylindrical casing member, said inner and outer members defining a pair of concentric chambers, a light source positioned in the outer chamber and sealed therein, a photocell positioned in said inner chamber and sealed therein, said inner cylindrical member being made of a light shielding material, said first cylindrical casing member and said centrally located cylindrical casing member being substantially the same axial dimension, a flexible diaphragm secured to said first cylindrical casing enclosing the same to complete the sealed chambers and being made of a light-transmitting material, an air source connected to said chambers and providing for variation in air pressure within said chambers, and attachment means connected to said support and adapted to mount said transducer on the head of the person whose blood pressure is to be taken.

4. A blood pressure measuring transducer comprising a first casing member, a second centrally located casing member positioned within said first casing member and defining with said first casing member a first and second chamber shielded from one another with a light opaque material, said first and second casing members being joined to a support, a light transmitting material covering the exposed extremities of said casing members and defining with said support and said casing members a sealed chamber, one of said chambers having a light source therein and the other a photocell therein and a source of air supply connected to said chambers and adapted to be varied to distort said light transmitting material, and attachment means secured to said support and adapted to mount said transducer on the forehead of a person whose blood pressure is to be measured, the variation in pressure in said chambers causing said light transmitting material to press against the forehead of said person occluding the blood therein and varying the amount of light reflected from the skull from the light source to said photocell.

5. A blood pressure measuring transducer comprising a first casing member, a second centrally located casing member positioned within said first casing member and defining with said first casing member a first and second chamber shielded from one another with a light opaque material, said first and second casing members being joined to a support, a light transmitting material covering the exposed extremities of said casing members and defining with said support and said casing members a sealed chamber, one of said chambers having a light source therein and the other a photocell therein and a source of air supply connected to said chambers and adapted to be varied to distort said light transmitting material, and attachment means secured to said support and adapted to mount said transducer on the forehead of a person whose blood pressure is to be measured, said first and second casing members being substantially the same dimension such that only the pressure in said chamber deflecting said diaphragm be effective in occluding blood flow.

6. In a blood pressure measuring transducer, a support, a first and second light opaque casings positioned concentrically with one another and attached to said support, a flexible end wall of light transmitting material attached to one of said casings to provide a sealed chamber with one of said casings and said support, a light source positioned in one of said casings and a photocell positioned in the other of said casings, connection means adapted to connect a source of air to said sealed chamber, and attachment means adapted to mount said transducer on the forehead of the person whose blood pressure is to be measured.

7. In a blood pressure measuring transducer, a support, a first and second light opaque casings positioned concentrically with one another and attached to said support, a flexible end wall of light transmitting material attached to one of said casings to provide a sealed chamber with at least one of said casings, a light source positioned in one of said casings and a photocell positioned in the other of said casings, and connection means adapted to connect a source of air to said sealed chamber, said casings being of such dimension that the light source will direct light to said photocell only upon reflection from the person to whom said transducer is attached.

References Cited in the file of this patent

UNITED STATES PATENTS

| | | |
|---|---|---|
| 2,149,735 | Henderson | Mar. 7, 1939 |
| 2,540,163 | Brosene et al. | Feb. 6, 1951 |
| 2,678,040 | Poole et al. | May 11, 1954 |
| 2,711,728 | Bailey | June 28, 1955 |
| 2,854,968 | Wright | Oct. 7, 1958 |